(12) United States Patent
Sano (10) Patent No.: US 7,167,679 B2
(45) Date of Patent: Jan. 23, 2007

(54) DISPLAY TERMINAL

(75) Inventor: Eiichi Sano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/964,497

(22) Filed: Oct. 13, 2004

(65) Prior Publication Data

US 2005/0059350 A1 Mar. 17, 2005

Related U.S. Application Data (62) Division of application No. 09/907,066, filed on Jul. 17, 2001, now Pat. No. 6,954,615.

(30) Foreign Application Priority Data

Jul. 25, 2000 (JP) ............................. 2000-223537
Aug. 3, 2000 (JP) ............................. 2000-235399

(51) Int. Cl.
*H04B 7/00* (2006.01)
(52) U.S. Cl. ............... 455/41.2; 455/226.1; 455/226.2; 370/352; 370/353; 370/356
(58) Field of Classification Search ............... 455/41.1, 455/41.2, 226.4, 226.1, 226.2, 426.1, 426.2, 455/566; 370/352, 353, 356, 465
See application file for complete search history.

(56) References Cited

U.S. PATENT DOCUMENTS 5,101,499 A 3/1992 Streck et al.
5,410,326 A 4/1995 Goldstein
5,410,343 A 4/1995 Coddington et al.

(Continued)

FOREIGN PATENT DOCUMENTS

CN 1235499 11/1999

(Continued)

OTHER PUBLICATIONS

Vazquez-Cortizo D et al: "FS-aloha, a collision resolution algorithm with Qos support for the contention channel in multiservices wireless Lan" Global Communications Conference (GLOBECOM 99), vol. 5, Dec. 5, 1999, pp. 2773-2777, XP010373453.

(Continued)

*Primary Examiner*—Matthew D. Anderson
*Assistant Examiner*—Sanh Phu
(74) *Attorney, Agent, or Firm*—Frommer Lawrence & Haug LLP; William S. Frommer; Paul A. Levy (57) ABSTRACT

A display terminal and display method for a radio LAN system for receiving image data from an apparatus by radio communication and displaying an image based on the received image data on a display are disclosed. The terminal includes a bit error calculator for calculating a bit error rate per unit time of digital data received from the apparatus and a movement determination section for determining from a pattern of variation of the calculated bit error rate whether or not said display terminal is moving. Also provided is a reception quality display controller for displaying a quality level of the received data at the display terminal on the display section when it is determined that the display terminal is moving.

20 Claims, 9 Drawing Sheets

U.S. PATENT DOCUMENTS

| | | | |
|---|---|---|---|
| 5,467,341 A | 11/1995 | Matsukane et al. | |
| 5,802,467 A | 9/1998 | Salazar et al. | |
| 5,862,339 A | 1/1999 | Bonnaure et al. | |
| 5,887,255 A * | 3/1999 | Jackson et al. | 455/426.1 |
| 5,896,131 A | 4/1999 | Alexander | |
| 5,917,810 A | 6/1999 | De Bot | |
| 5,920,701 A | 7/1999 | Miller et al. | |
| 5,933,141 A | 8/1999 | Smith | |
| 5,949,432 A | 9/1999 | Gough et al. | |
| 6,012,088 A | 1/2000 | Li et al. | |
| 6,028,600 A | 2/2000 | Rosin et al. | |
| 6,037,998 A | 3/2000 | Usui et al. | |
| 6,097,441 A | 8/2000 | Allport | |
| 6,211,858 B1 * | 4/2001 | Moon et al. | 715/771 |
| 6,263,503 B1 | 7/2001 | Margulis | |
| 6,363,245 B1 | 3/2002 | Natori | |
| 6,396,523 B1 | 5/2002 | Segal et al. | |
| 6,400,962 B1 * | 6/2002 | Yamada | 455/552.1 |
| 6,417,869 B1 | 7/2002 | Do | |
| 6,469,633 B1 | 10/2002 | Wachter | |
| 6,670,970 B1 | 12/2003 | Bonura et al. | |
| 6,819,944 B1 * | 11/2004 | Sato | 455/566 |
| 6,954,615 B1 * | 10/2005 | Sano | 455/41.1 |

FOREIGN PATENT DOCUMENTS

| | | |
|---|---|---|
| CN | 1249644 | 4/2000 |
| DE | 196 28 540 | 1/1998 |
| DE | 200 00 450 | 3/2000 |
| EP | 0 477 754 | 4/1992 |
| EP | 0 537 814 | 4/1993 |
| EP | 0 617 556 | 9/1994 |
| EP | 0 793 170 | 9/1997 |
| EP | 0 838 945 | 4/1998 |
| EP | 0 848 560 | 6/1998 |
| EP | 0 942 572 | 9/1999 |
| EP | 0 967 797 | 12/1999 |
| EP | 1 001 627 | 5/2000 |
| EP | 1 011 257 | 6/2000 |
| GB | 2 343 334 | 5/2000 |
| WO | WO 95 34168 | 12/1995 |
| WO | WO 98 59282 | 12/1998 |
| WO | WO 99 34599 | 7/1999 |
| WO | WO 00 14919 | 3/2000 |
| WO | WO 01 35551 | 5/2001 |
| WO | WO 01 35585 | 5/2001 |

OTHER PUBLICATIONS

"Wireless Medium Access Control (MAC) and Physical (PHY) Specifications" IEEE Standard 802.11-1997, XX, XX, 1997, pp. 71-99, XP002927753.

Gang Wu et al: "WINMAC: a novel transmission protocol for infostations" Vehicular Technology Conference, 1999 IEEE 49th Houston, TX, USA May 16-20, 1999, Piscataway, NJ, USA, IEEE, US, May 16, 1999, pp. 1340-1344, XP010342188, ISBN: 0-7803-5565-2.

Truman T et al: "The Infopad Multimedia Terminal: A Portable Device for Wireless Information Access" IEEE Transactions on Computers, IEEE Inc. New York, US, vol. 47, No. 10, Oct. 1, 1998, pp. 1073-1087, XP000781992.

Patent Abstracts of Japan vol. 1998, No. 14, Dec. 31, 1998, & JP 10 257401 A (ACCESS:KK) Sep. 25, 1998.

Patent Abstracts of Japan, 2001-177478 dated Jun. 29, 2001.

* cited by examiner

DISPLAY TERMINAL

CROSS-REFERENCE TO RELATED APPLICATION

This application is a division of application Ser. No. 09/907,066, filed Jul. 17, 2001 now U.S. Pat. No. 6,954,615.

BACKGROUND OF THE INVENTION

This invention relates generally to a display terminal for use with a radio LAN (Local Area Network) system and more specifically to a display terminal for use with a radio LAN system that allows for access to a number of different received data.

In order to view an audio/video program, access the Internet, or perform various other desired functions with a computer it is conventionally necessary to maintain at least one hard-wired connection so that desired data may be transferred from any number of remote sites to the computer for processing, and then to an associated display device for display. It would therefore be beneficial to provide an improved device allowing for access to the above functions without maintaining such a hard-wired connection.

SUMMARY OF THE INVENTION

Therefore, generally speaking, in accordance with the invention, an improved display terminal for a radio LAN system is provided. This improved display terminal allows a user to readily determine with certainty a location at which multi-path interference is low and reception quality of transmitted data is high so that data transmitted from another apparatus to the display terminal can be properly received.

In accordance with the invention, it has been proposed to construct a radio LAN system from a plurality of apparatus and transmit and receive data between the various apparatus in a limited area such as within a house or within a room. To this end, the IEEE (The Institute of Electrical and Electronics Engineers, Inc.) 802.11 standards prescribe the use of either a 2.4 GHz band or a 5 GHz band radio frequency band for such a radio LAN system.

A radio LAN system of this type includes a base apparatus, an external apparatus, and a display terminal. The base apparatus includes a built-in tuner and to which a telephone circuit or the like is connected. The external apparatus includes a receiver or a DVD (Digital Video Disc or Digital Versatile Disc) player or the like. The display terminal communicates with the base apparatus by radio to send a command to the base apparatus, or to receive image, audio or other data from the base apparatus to display an image on a display section and output sound from a speaker or an earphone. Thus, a user of the radio LAN system can access the Internet, enjoy a television broadcast or a BS/CS (broadcasting satellite/communications satellite) digital broadcast or play back a DVD using the display terminal regardless of the location of the user in a house or in a room.

When such a radio communication apparatus in accordance with the invention is used for communication, the electric field intensity at a reception location is measured and may be displayed. The user may first look at the display to confirm that the electric field intensity is higher than a predetermined level, and then may proceed with the desired communication.

However, the frequency band used by such a radio LAN system is a very high frequency ranging from the 2.4 GHz band to the 5 GHz band in the microwave range of the electromagnetic spectrum as defined by the ISM (Industrial Scientific Medical) band. If a radio LAN system is constructed and used indoors as described above, it is liable to be influenced by multi-path interference by various reflections of radio waves by walls, pillars and so forth of the various rooms of use. Even if the electric field intensity as measures by the display terminal is sufficiently high, depending upon the location of the display terminal, the reception quality level may be deteriorated by high multi-path interference. This deteriorates the video and/or audio quality.

Therefore, further in accordance with the invention a display terminal is provided for use with a radio LAN system. The display terminal is provided for receiving image data from a transmitting apparatus by radio communication. The display terminal then displays an image based on the received image data on a display thereof. The display terminal further comprises a movement discrimination or determination section for calculating a bit error rate per unit time of digital data received from the transmitting apparatus. From a pattern of variation of the calculated bit error rate the display terminal can determine whether or not it is moving. A reception quality display control section is also provided for displaying on the display section a quality level of data reception at the display terminal when it is determined by the movement discrimination section that the display terminal is moving.

In accordance with the display terminal for a radio LAN system constructed in accordance with the invention, a user carrying the display terminal including the reception quality level displayed on the display section can readily and with certainty determine a location at which the multi-path interference is low and the data reception quality level is high. Thus, at such a location the display terminal can properly receive data transmitted from the transmitting apparatus.

The user can therefore readily and with certainty determine when the reception quality level is low due to high multi-pass interference. When the reception quality level is low, the user can change to a more desirable location so that the display terminal can receive data transmitted from the transmitting apparatus where the multi-path interference is low and the reception quality level is high.

According to another aspect of the invention, a display terminal for a radio LAN system is provided. The display terminal is configured for receiving image data from a transmitting apparatus by radio communication and displaying an image based on the received image data on a display section. The display terminal comprises a reception quality supervision section for calculating a bit error rate per unit time of digital data received from the transmitting apparatus. This calculated bit error rate is compared with a threshold value. A reception quality display control section displays a reception quality level of the display terminal on a display section of the display terminal indicative of an output of the reception quality supervision section.

Further in accordance with the invention, the reception quality display control section may display the reception quality level of the display terminal on the display section only when the reception quality display control section is instructed to turn on.

Additionally in accordance with the invention, the reception quality display control section may continuously display on the display section a variation of the reception quality level of the display terminal with respect to time as a bar graph or as a numerical value based on the output of the reception quality supervision section.

In accordance with the display terminal for a radio LAN system constructed in accordance with the invention, when the user uses the display terminal to receive data transmitted from the transmitting apparatus, the user can readily and with certainty determine if the reception quality level is low due to high multi-pass interference. When the reception quality level is low, the user can change the reception location. In this manner the display terminal can receive data transmitted from the transmitting apparatus so that the multi-path interference is low and the reception quality level of the transmitted signal is high.

The invention accordingly comprises the several steps and the relation of one or more of such steps with respect to each of the others, and the apparatus embodying features of construction, combinations of elements and arrangements of parts that are adapted to effect such steps, all as exemplified in the following detailed disclosure, and the scope of the invention will be indicated in the claims.

DETAILED DESCRIPTION OF THE PREFERRED EMBODIMENTS

Figure 1:
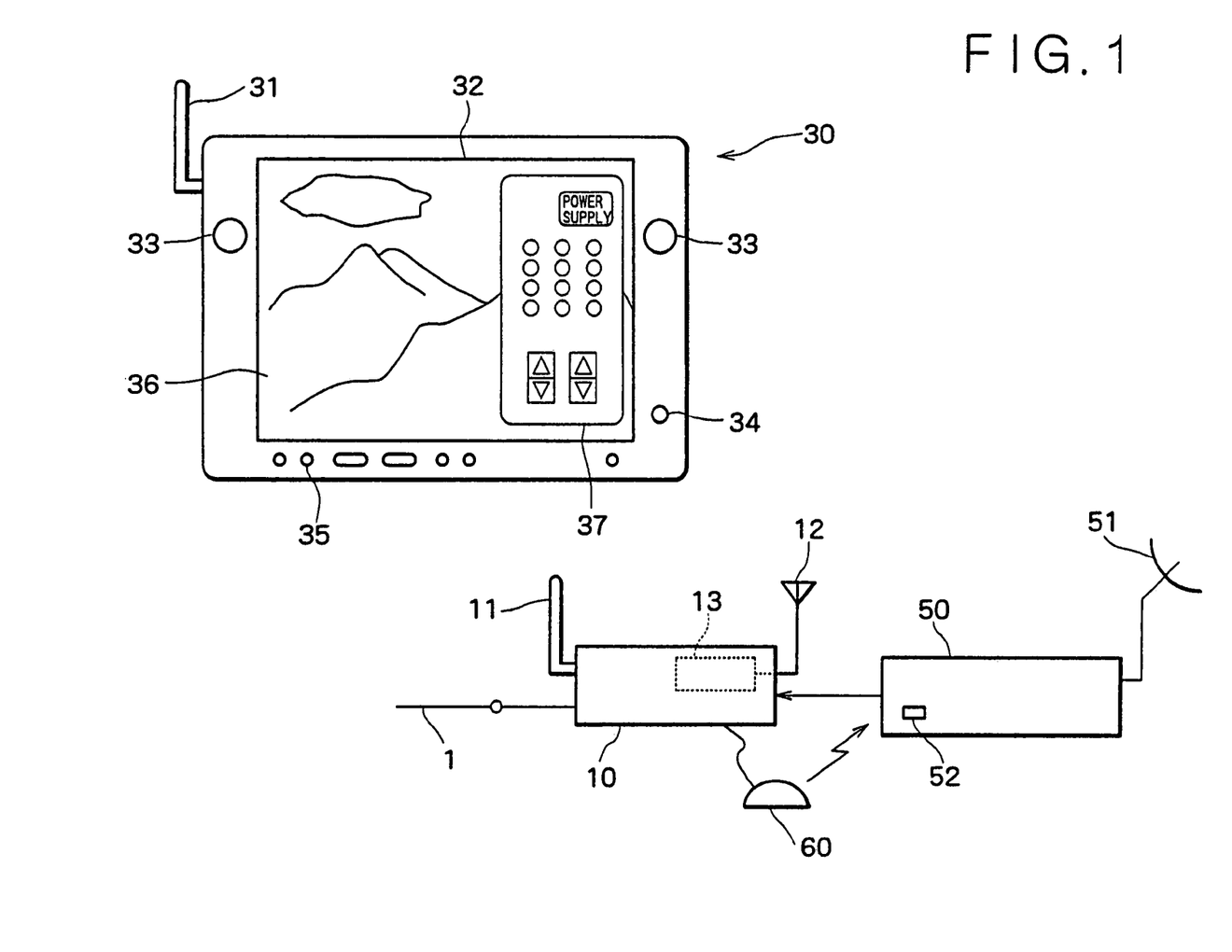
FIG. 1 is a schematic view showing an example of radio LAN system including a display terminal constructed in accordance with the invention.

Referring first to FIG. 1, an example of radio LAN system constructed in accordance with the invention, and into which a display terminal according to the present invention can be incorporated, is shown. The radio LAN system shown in FIG. 1 includes a base apparatus 10 and a display terminal 30.

A telephone circuit 1 is connected to base apparatus 10. Base apparatus 10 also includes an antenna 11 for radio communication with display terminal 30 so that display terminal 30 is able to perform telephone communication as desired utilizing radio communication with base apparatus 10 (as will be described below) and access the Internet. Of course, any manner for accessing the Internet may be employed by display terminal 30, as long as this method of access is properly connected to base unit 10.

Further, an antenna 12 for receiving a ground wave television broadcast is connected to the base apparatus 10. A tuner 13 is built into base apparatus 10 so that display terminal 30 can receive video and audio of a ground wave television broadcast through radio communication with base apparatus 10. Of course, rather than an antenna, a cable feed wire or other transmission media for a television broadcast may be coupled with base apparatus 10. In accordance with such a configuration, tuner 13 would be configured to allow a user to select from among various audio/video programs provided via the provided transmission media.

Furthermore, a receiver (set top box: STB) 50 for a BS/CS digital broadcast may be connected to base apparatus 10. A parabolic antenna 51 including a converter for receiving a BS/CS digital broadcast is connected to receiver 50 so that the display terminal 30 can receive audio/video program information and so forth of a BS/CS digital broadcast through radio communication with base apparatus 10.

A remote controller transmitter 60 such as a remote controller mouse or the like is connected to base apparatus 10. An infrared remote control signal transmitted from remote controller transmitter 60 is received by a remote control signal reception section 52 provided on receiver 50 to control receiver 50. Of course other control devices, such as a radio wave remote control, or hardwired controller may be provided for allowing control of receiver 50.

Display terminal 30 includes an antenna 31 for radio communication with base apparatus 10, a liquid crystal display (LCD) apparatus 32 for displaying an image, a speaker 33 for outputting sound, and a microphone 34 for inputting sound. Display terminal 30 further includes a key selection and operation section 35 including a power supply key, an Internet key, an electronic mail key, a channel selection key and a sound volume adjustment key.

Further, a touch panel 36 is provided on a screen of LCD apparatus 32 so that, when a user touches touch panel 36 within a predetermined region, a control panel 37 is displayed on LCD apparatus 32. A user can touch a key switch section of control panel 37 to control various functions of base apparatus 10.

Figure 2:
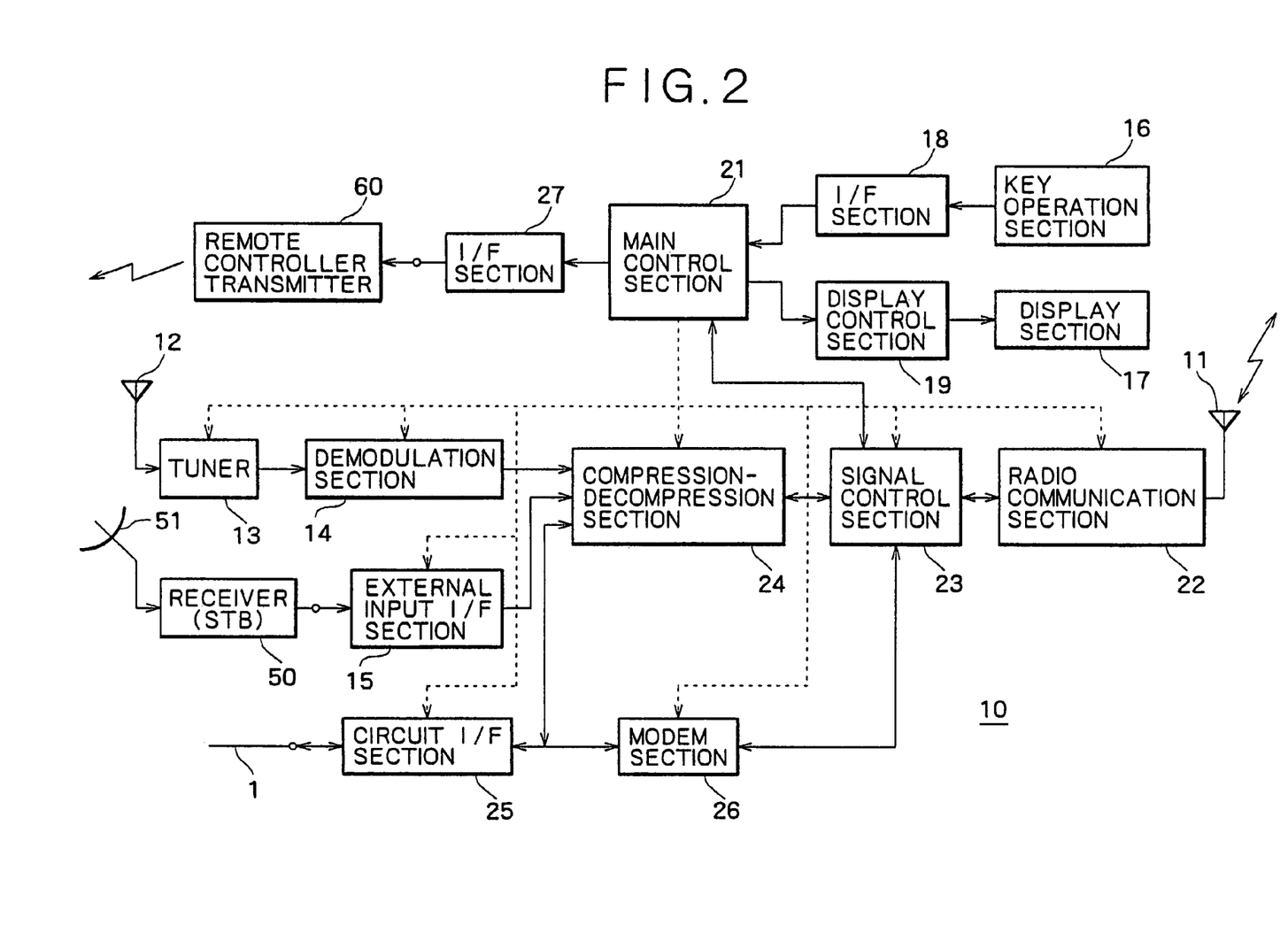
FIG. 2 is a block diagram depicting the configuration of a base apparatus of the radio LAN system of FIG. 1 constructed in accordance with the invention.
Figure 3:
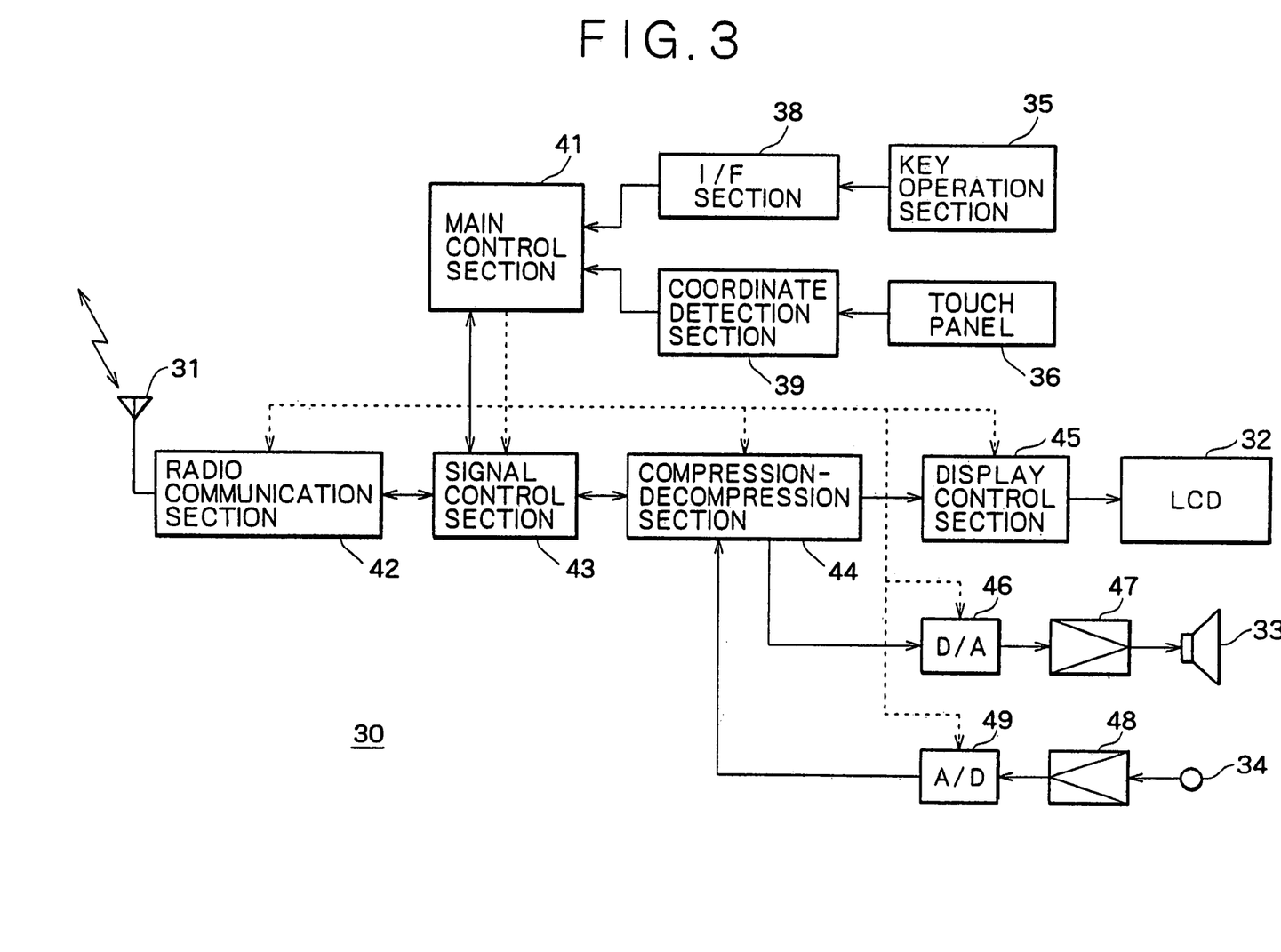
FIG. 3 is a block diagram depicting the configuration of the display apparatus shown in FIG. 1 constructed in accordance with the invention.

Base apparatus 10 is functionally configured as shown in FIG. 2 while the display terminal 30 is functionally configured as shown in FIG. 3, as will now be described.

Referring next to FIG. 2, base apparatus 10 includes a key operation section 16 and a display section 17 which function as a user interface between the user and base apparatus 10. Key operation section 16 is connected to a main control section 21 through an interface section 18. Display section 17 is connected to main control section 21 through a display control section 19. Remote controller transmitter 60 is connected to main control section 21 through an interface section 27.

A signal of a ground wave television broadcast selected by tuner 13 from a data signal received by antenna 12 is demodulated by a demodulation section 14 and sent to a compression-decompression section 24. A signal of a BS/CS digital broadcast selected by receiver 50 is sent to compression-decompression section 24 through an external input interface (I/F) section 15. Telephone circuit 1 is connected to compression-decompression section 24 through a circuit interface section 25 and is also connected to a signal control section 23 through a modem section 26.

Compression-decompression section 24 compresses video data and audio data from demodulation section 14, external input interface section 15 and circuit interface section 25 in accordance with a predetermined compression system such as, for example, the MPEG (Moving Picture Experts Group) system. The compressed video data and audio data are forwarded to signal control section 23.

Further, compression-decompression section 24 decompresses compressed audio data transmitted thereto from display terminal 30. This compressed audio data is received by a radio communication section 22 and then forwarded from radio communication section 22 to compression-decompression section 24 through signal control section 23. The decompressed audio signal data is then forwarded to circuit interface section 25.

Radio communication section 22 modulates data forwarded from signal control section 23 in accordance with a predetermined modulation system such as, for example, the CCK (Complementary Code Keying) system or the OFDM (Orthogonal Frequency Division Multiplexing) system. The modulated data is then converted into a high frequency signal in the 2.4 GHz band or the 5 GHz band. The high frequency signal is then transmitted from antenna 11 to display terminal 30. Radio communication section 22 also converts a high frequency signal transmitted thereto from display terminal 30 and received by antenna 11 into an intermediate frequency signal, demodulates the intermediate frequency signal and forwards the demodulated data to signal control section 23.

Signal control section 23 arbitrates and selectively forwards video data and audio data compressed by compression-decompression section 24, data received by modem section 26 and control data from main control section 21 to radio communication section 22. Further, signal control section 23 selectively forwards data transmitted from display terminal 30 and received by radio communication section 22. This received data is then forwarded from radio communication section 22 to signal control section 23, and from signal control section 23 to main control section 21, modem section 26 and compression-decompression section 24.

Main control section 21 controls the components of base apparatus 10. Main control section 21 comprises, though not shown in FIG. 2, a CPU (Central Processing Unit), a ROM (Read Only Memory) in which programs to be executed by the CPU, fixed data and so forth are written, a RAM (Random Access Memory) which functions as a working area of the CPU and other necessary elements.

Referring next to FIG. 3, display terminal 30 constructed in accordance with the invention includes a main control section 41 to which key operation section 35 is connected through an interface section 38. Further, a coordinate detection section 39 is provided as an interface for touch panel 36 and detects coordinates of a touched position of touch panel 36. The detected coordinate values are forwarded to main control section 41.

If touch panel 36 is touched in the predetermined region thereof, then main control section 41 controls a display control section 45 to display control panel 37 on LCD apparatus 32. Then, if the key switch section of control panel 37 displayed on the LCD apparatus 32 is touched, main control section 41 produces control data in response to the touched position of the key switch section. Further, if key operation section 35 is operated, main control section 41 produces control data in response to the operated key. The control data produced by main control section 41 is forwarded to a signal control section 43.

In display terminal 30, an audio signal from microphone 34 is amplified by an audio amplifier 48 and converted into digital audio data by an A/D (analog to digital) converter 49. The audio data is compressed in accordance with a predetermined compression system by a compression-decompression section 44. The compressed audio data is then forwarded to signal control section 43.

Signal control section 43 arbitrates and selectively signals control data from main control section 41 and audio data compressed by compression-decompression section 44 to a radio communication section 42. Further, signal control section 43 selectively forwards data transmitted from base apparatus 10 and received by radio communication section 42. Control and other data that are previously received by modem section 26 of base apparatus 10 are forwarded to main control section 41, while compressed video data and audio data are forwarded to compression-decompression section 44.

Radio communication section 42 modulates data forwarded from signal control section 43 in accordance with a predetermined modulation system, converts the modulated data into a high frequency signal in the 2.4 GHz band or the 5 GHz band and transmits the high frequency signal from antenna 31 to base apparatus 10. Further, radio communication section 42 converts a high frequency signal transmitted from base apparatus 10 and received by antenna 31 into an intermediate frequency signal, demodulates the intermediate frequency signal and forwards the demodulated data to signal control section 43.

Compression-decompression section 44 decompresses compressed video data and audio data forwarded from signal control section 43. The decompressed video data is displayed as an image on LCD apparatus 32 under the control of display control section 45. The decompressed audio data is converted into an analog audio signal by a D/A (digital to analog) converter 46, is amplified by an audio amplifier 47 and is output as sound from speaker 33.

Main control section 41 controls the components of display terminal 30 and includes, though not shown in FIG. 3, a CPU, a ROM, a RAM and so forth similarly to main control section 21 of base apparatus 10.

In order to receive a ground wave television broadcast or a BS/CS digital broadcast at display terminal 30 in the radio LAN system described above, video data and audio data from demodulation section 14 or external input interface section 15 of base unit 10 are first compressed by compression-decompression section 24. This compressed data is then transmitted by radio communication section 22 under the control of signal control section 23 to display terminal 30. In display terminal 30, the compressed video data and audio data are first received by radio communication section 42. This received data is then forwarded to and decompressed by compression-decompression section 44 under the control of signal control section 43. Consequently, an image is displayed on LCD apparatus 32 and sound is output from speaker 33.

If a user selects a channel using key operation section 35 or control panel 37, a command is transmitted from main control section 41 of display terminal 30 to the base apparatus 10 by radio communication section 42 under the control of signal control section 43.

In base apparatus 10, the transmitted command is received by radio communication section 22 and sent to main control section 21 under the control of signal control section 23. Main control section 21 controls tuner 13 to select a channel in accordance with the received command. Alternatively, remote controller transmitter 60 may control receiver 50 to select a channel.

In order to access the Internet, a user operates key operation section 35 or control panel 37 to request connection to an ISP (Internet Service Provider). The request is transmitted from main control section 41 of display terminal 30 to base apparatus 10 by radio communication section 42 under the control of signal control section 43.

In base apparatus 10, the request is received by radio communication section 22 and is forwarded to main control section 21 under the control of signal control section 23. Consequently, modem section 26 and circuit interface section 25 are controlled in response to the request by main control section 21 to establish a connection to the ISP. Then, for example, data sent from the ISP to telephone circuit 1 in response to the access request to a certain homepage is sent to signal control section 23 through circuit interface section 25 and the modem section 26. This data is in turn transmitted to display terminal 30 by radio communication section 22.

In display terminal 30, the data is received by the radio communication section 42 and sent to main control section 41 under the control of signal control section 43. Main control section 41 processes the data to produce display data. This display data is then forwarded to display control section 45 so that the retrieved homepage is displayed on the LCD apparatus 32. Of course, access to the Internet may be performed employing any other type of provided ISP connection, including but not limited to cable transmissions, satellite transmissions, DSL transmissions, or any other information data transmission medium.

In order to perform the function of allowing for a telephone conversation, a transmission audio signal from microphone 34 of display terminal 30 is converted into digital audio data by A/D converter 49 and compressed by compression-decompression section 44. Then, the compressed audio data is transmitted to base apparatus 10 by radio communication section 42 under the control of the signal control section 43.

In base apparatus 10, the compressed audio data is received by radio communication section 22. This received data is in turn forwarded to and decompressed by compression-decompression section 24 under the control of signal control section 23. Then, the decompressed transmission audio signal is forwarded to telephone circuit 1 through circuit interface section 25.

Meanwhile, a received audio signal transmitted over telephone circuit 1 is sent through circuit interface section 25 to compression-decompression section 24 where it is compressed. The compressed audio data is transmitted to display terminal 30 by radio communication section 22 under the control of signal control section 23.

In display terminal 30, the compressed audio data is received by radio communication section 42. This received audio data is forwarded to and decompressed by compression-decompression section 44 under the control of signal control section 43. Then, the decompressed audio data is converted into an analog audio signal by D/A converter 46 and output as a voice from speaker 33.

The further embodiments of the invention can be applied to display terminal 30 in the radio LAN system having such a configuration as described above. A further embodiment of the invention wherein the display terminal 30 may display a reception quality level is described below.

Figure 4:
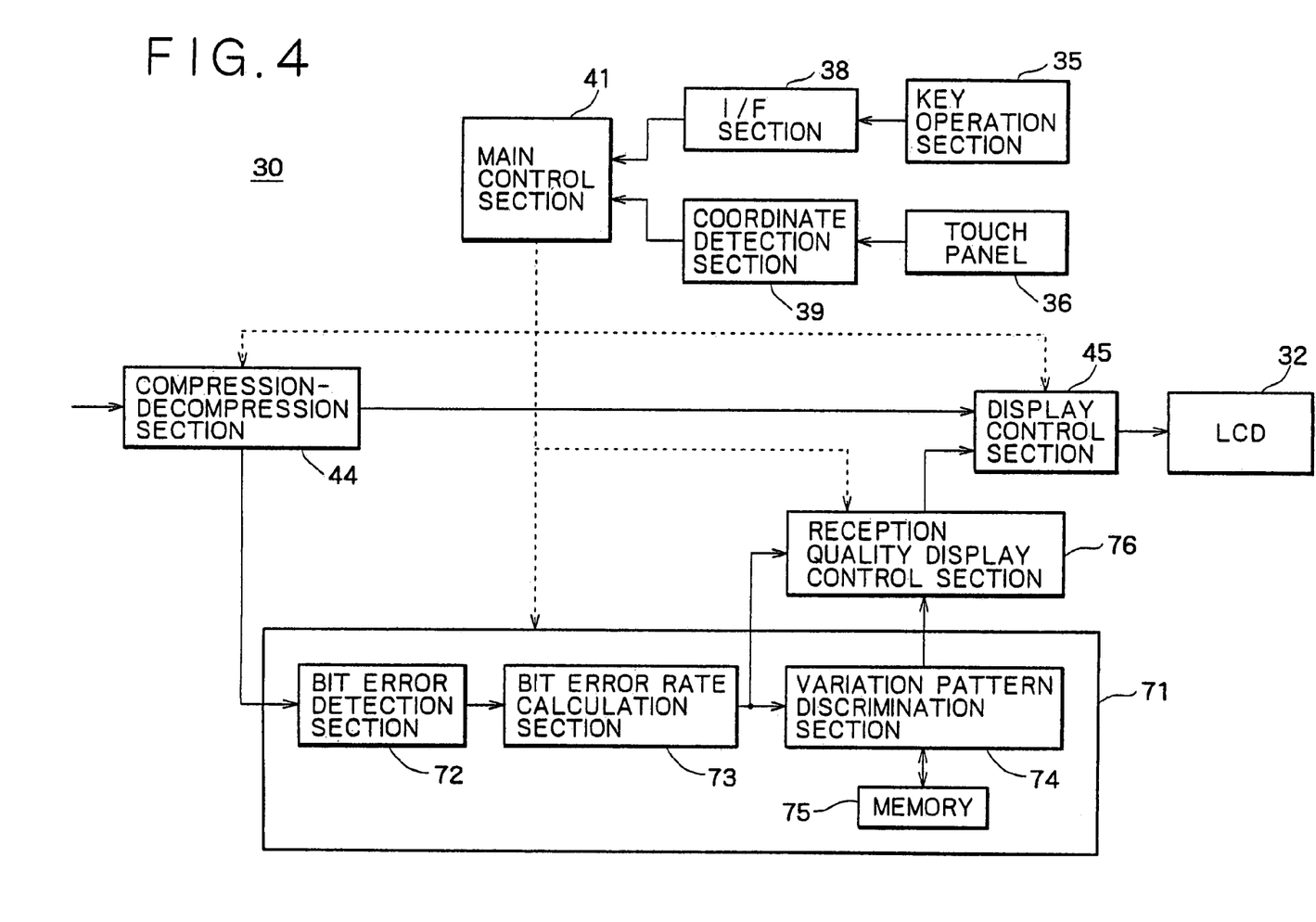
FIG. 4 is a block diagram depicting the configuration of a display terminal constructed in accordance with the invention and to which the present invention is applied and which displays a reception quality level.

FIG. 4 depicts display terminal 30 including the ability to display a signal reception quality level. Referring to FIG. 4, in display terminal 30 constructed in accordance with the invention, compressed data received from base apparatus 10 is decompressed by compression-decompression section 44. The decompressed data is forwarded to a movement discrimination or determination section 71, and is also subjected to bit error correction.

Data is received by base apparatus 10 and is in turn transmitted to display terminal 30. This transmitted and received data is easily displayed when the user views an image and listens to sound at a location where proper and high quality reception of the data by display terminal 30 is possible. Alternatively, if the user is trying to find a place in a house or the like in advance, before transmission of the data, that is suitable for high quality reception of the transmitted data by display terminal 30, fixed data stored in base apparatus 10 may be transmitted from base apparatus 10 to display terminal 30 to determine a proper location for subsequently receiving live data. This stored data can be transmitted from base unit 10 to display terminal 30 in response to the operation of key operation section 16 of base apparatus 10, or in response to a request input through key operation section 35 or control panel 37 of display terminal 30.

Figure 5:
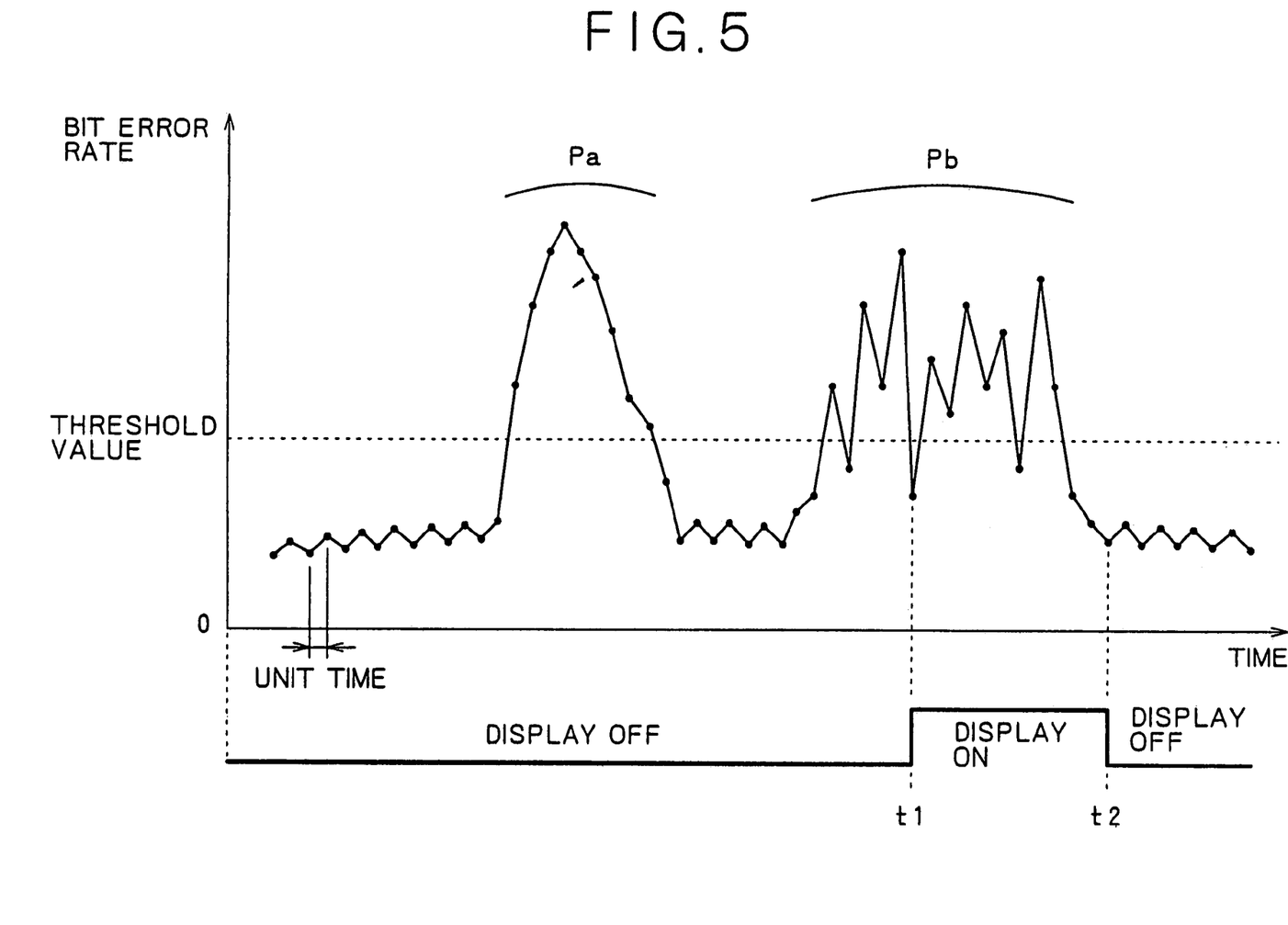
FIG. 5 is a graph illustrating a relationship between the variation of the bit error rate and an ON and OFF toggle of the display of the reception quality level of the display terminal shown in FIG. 4 constructed in accordance with the invention.

In movement discrimination section 71, prior to error correction of the data forwarded from compression-decompression section 44, bit errors contained in the decompressed data are detected by a bit error detection section 72. A bit error rate per unit time is calculated as shown in FIG. 5 by a bit error rate calculation section 73. The unit time indicated in FIG. 5 may be set to several fractions of a second or to approximately one second in a preferred embodiment, but may be any desired time allowing for a plurality of bit error rate determinations so that a proper comparison may be made.

Further, in movement discrimination section 71, a variation pattern discrimination section 74 successively writes successively calculated bit error rates from bit error rate calculation section 73 into a memory 75. These stored bit error rates are then read out of memory and are used to determine a pattern of the variation of the bit error rate per a plurality of unit times, as is once again shown by the graph in FIG. 5. Bit error detection section 72, bit error rate calculation section 73 and variation pattern discrimination section 74 of movement discrimination section 71 may be formed from a CPU, a ROM, a RAM and so forth which form the main control section 41. Also a RAM or the like, which is preferably a component of main control section 41 can be used for memory 75. Of course other memory schemes may be used for all of these components, as are well known in the art.

When the reception electric field intensity at display terminal 30 is sufficiently high and the multi-path interference is sufficiently low, the bit error rate will be lower than a predetermined threshold value, as is shown at a left side portion of FIG. 5. In this case, a variation of the bit error rate is also small. Because reception quality is high and error rates are low, variation pattern discrimination section 74 outputs an instruction that cancels any display of the reception quality level. Because the quality is high, the user need not be concerned with the quality level, and therefore the level need not be displayed.

While a user is viewing and listening to video and audio data having a high reception quality, if a person passes between base apparatus 10 and display terminal 30, a rectilinearly propagating wave carrying the video and audio data from base apparatus 10 is weakened. As a result, the bit error rate becomes very high and jumps above the threshold value as indicated as a pattern Pa in FIG. 5. In this instance, however, the bit error rate varies monotonously such that it first increases monotonously and then decreases monotonously. Because the recognition of such a pattern indicates only a temporary interference, variation pattern discrimination section 74 still outputs a command to cancel the display indicative of the reception quality level.

On the other hand, if the user is moving display terminal 30, then even if the reception electric field intensity is sufficiently high, the multi-path interference increases, and consequently, the bit error rate increases beyond the threshold value as indicated as a pattern Pb in FIG. 5. In this case, however, the multi-pass interference does not increase or decrease monotonously. Rather, it varies greatly, exhibiting a high value at a certain instant (at a certain location of the display terminal) and exhibiting a low value at a next instant (at another location). The value at any one time depends upon the positional relationship between display terminal 30 and base unit 10, including any walls, pillars and the like between the two. As a result of this variation of the multi-pass interference, the bit error rate also varies greatly so that it exhibits a high value during a first unit time but exhibits a low value within a next unit time.

Based on the pattern of the variation of the bit error rate noted above, variation pattern discrimination section 74 outputs a signal which turns on the display of the reception quality level indicator. However, a certain predetermined number of unit times must pass before a true pattern confirmation can be confirmed. This is because the determination of the variation pattern of bit error rates requires that a plurality of bit error rates for a plurality of unit times be stored in the memory 75 for comparison. Therefore, even at the beginning of such a pattern Pb being detected, the display of the reception quality level is delayed until a point t1, a predetermined amount of time from the beginning of pattern Pb.

Referring once again to FIG. 4, the signal output from variation pattern discrimination section 74, and therefore movement discrimination section 71, is a signal for controlling the display of the reception quality level indicator at a reception quality display control section 76. In addition to this signal, the bit error rate calculated by bit error rate calculation section 73 is forwarded reception quality display control section 76, and therefore comprises data representative of the reception quality level at display terminal 30.

When the output signal of variation pattern discrimination section 74 indicates a display-on condition reception quality display control section 76 produces data for displaying the reception quality level. This reception quality level may be displayed as a bar graph and a numerical value on LCD apparatus 32. This display data is forwarded to display control section 45.

Figure 6A:
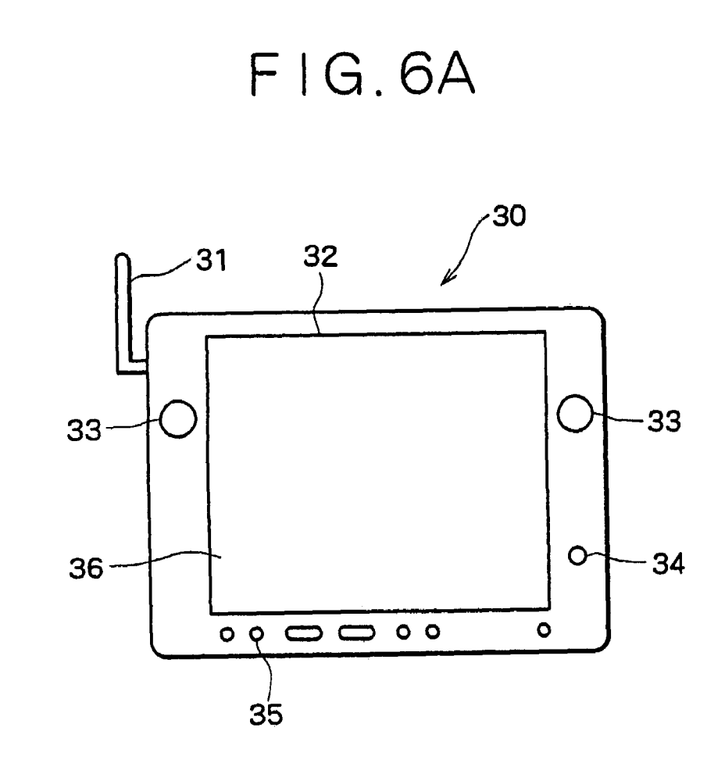
FIGS. 6A and 6B are schematic views of the display terminal of FIG. 4 constructed in accordance with the invention when the display of the reception quality level is off and on, respectively.
Figure 6B:
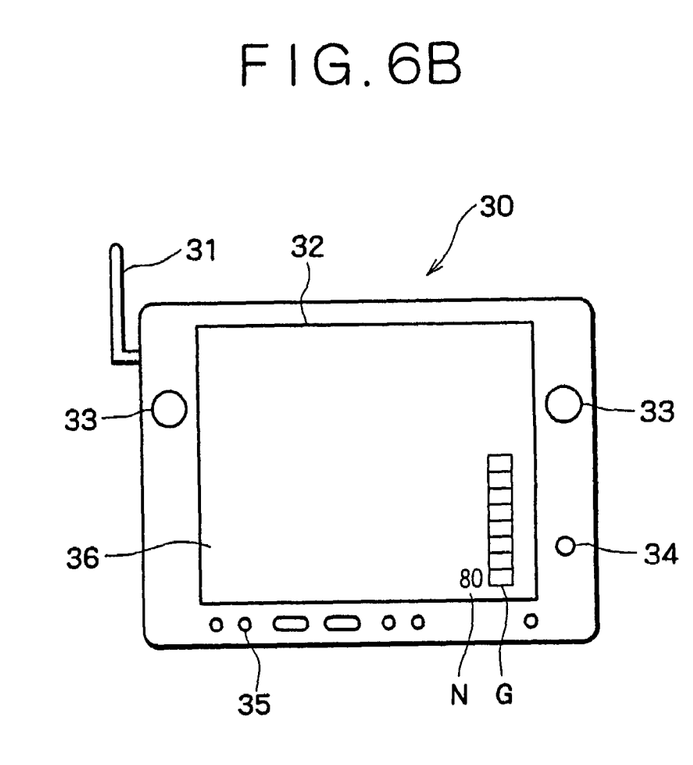

Therefore, in accordance with the invention and as is shown in FIG. 6A, a reception quality level is not displayed when the reception electric field intensity at display terminal 30 is sufficiently high and the multi-pass interference is sufficiently low (as shown at the left side portion of FIG. 5) or when the bit error rate exhibits a high bit error rate because a rectilinearly propagating wave from the base apparatus 10 is weakened (as shown at the pattern Pa in FIG. 5). However, if display terminal 30 is moved, this movement is detected at the point t1 (as indicated at pattern Pb in FIG. 5). Reception quality level is then displayed as a bar graph G and a numerical value N on LCD apparatus 32 as is shown in FIG. 6B. Reception quality display control section 76 is configured such that as the bit error rate decreases, the bar graph G becomes longer and the numerical value N becomes higher.

Thus, the user may look at the display of the reception quality level and move display terminal 30 to a location at which the bar graph G is sufficiently long and the numerical value N is sufficiently high, indicating a high quality data reception. Thus, the user can quickly and with certainty determine a location at which the multi-pass interference is low and the reception quality level is high.

If display terminal 30 is moved to a location at which the bar graph G is sufficiently long and the numerical value N is sufficiently high, thus indicating high quality signal reception, then the bit error rate becomes lower than the threshold value and also the variation of the bit error rate becomes small. Consequently, at such a time t2 as shown in FIG. 5, the signal output of variation pattern discrimination section 74 turns off the display of the reception quality level. Accordingly, after time t2 display terminal 30 can receive data transmitted from base apparatus 10 with low multi-pass interference is low and a high reception quality level. The reception quality level is therefore not displayed as shown in FIG. 6A.

Therefore, in accordance with this embodiment of the invention the user can easily determine a location at which the multi-pass interference is low and the reception quality level is high. At such a determined location the display terminal can receive data transmitted from base apparatus 10. Furthermore, the reception quality level is displayed on LCD apparatus 32 only when display terminal 30 is being moved. But after display terminal 30 is maintained at a location where the reception quality level is high, the reception quality level is no longer displayed. Therefore, the bar graph G and the numeric value N of the display of the reception quality level do not hinder the user looking at a displayed image transmitted from the base apparatus 10.

In display terminal 30 of the embodiment described above, the reception quality level is preferably displayed as a bar graph G and a numerical value N. However, the reception quality level may otherwise be displayed as only one of a bar graph and a numerical value. Alternatively some other graph such as a circle graph or the like may be used. Indeed, any method of indicating a relative signal quality may be employed in accordance with the invention.

Further, it is possible to connect an external apparatus such as a DVD player or a digital VTR (Video Tape Recorder) to base apparatus 10 such that video data and audio data from the external apparatus is transmitted from base apparatus 10 to display terminal 30.

Furthermore, it is possible to construct a radio LAN system from one base apparatus and a plurality of display terminals, from a plurality of base apparatus and one display terminal or from a plurality of base apparatus and a plurality of display terminals.

Figure 7:
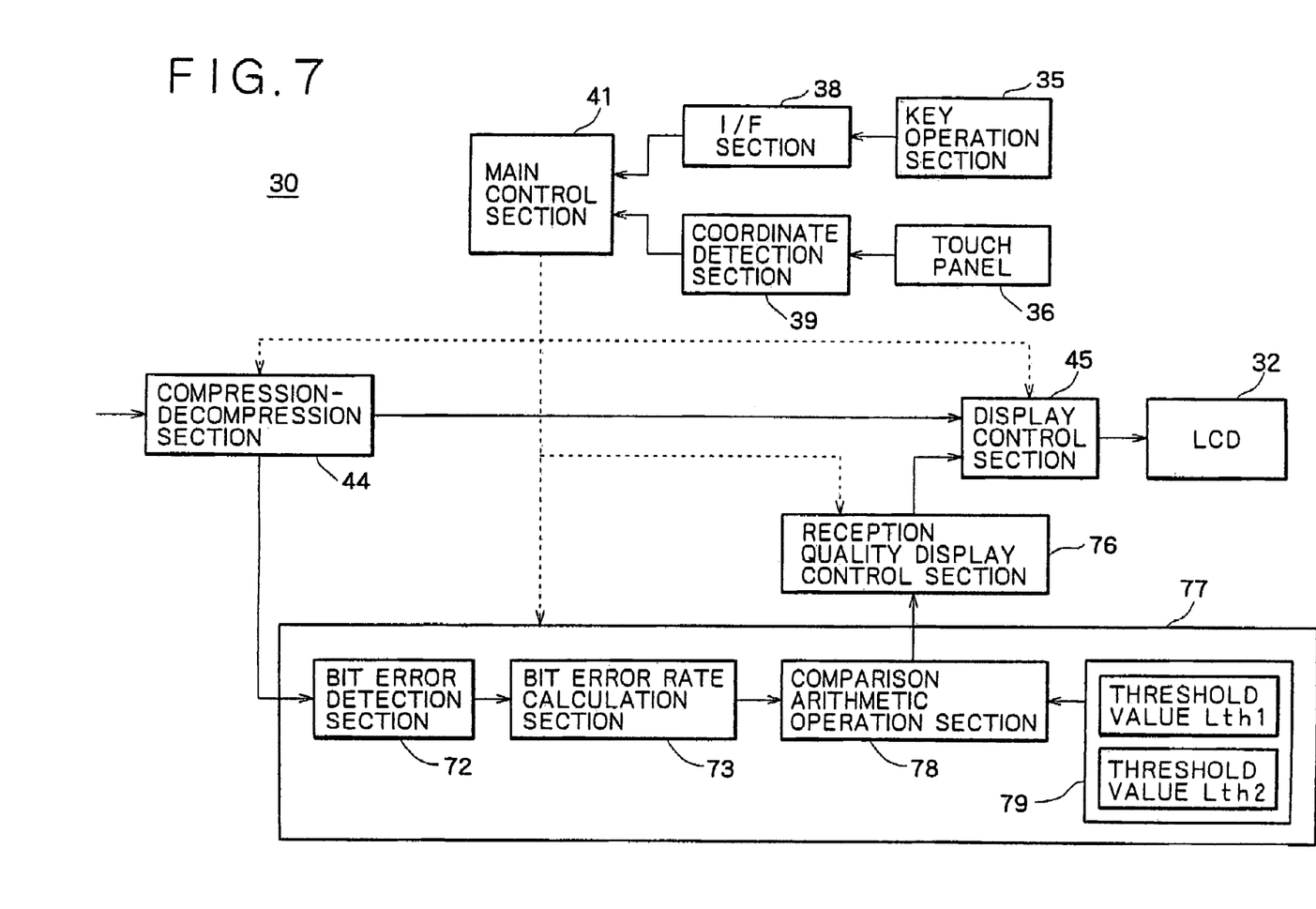
FIG. 7 is a block diagram depicting the configuration of another display terminal constructed in accordance with an additional embodiment of the invention, and to which the present invention is applied and which displays a reception quality level.

Referring next to FIG. 7, an additional embodiment of display terminal 30 constructed in accordance with the invention is shown. Display terminal 30 of the present embodiment has construction similar to that of display terminal 30 of the first embodiment. Display terminal 30 of the present embodiment is different from the display terminal of the first embodiment in that it includes a reception quality supervision section 77 in place of movement discrimination section 71.

Reception quality supervision section 77 includes a bit error detection section 72 and a bit error rate calculation section 73 similar to those of movement discrimination section 71 of the display terminal of the first embodiment. Reception quality supervision section 77 further includes a comparison arithmetic operation section 78 and a memory 79.

Compressed data received from base apparatus 10 is decompressed by compression-decompression section 44 and is forwarded reception quality supervision section 77. The decompressed data is also subject to bit error correction by compression-decompression section 44.

Data is received by base apparatus 10 and is in turn transmitted to display terminal 30. This transmitted and received data is easily displayed at display terminal 30 when the user views an image and listens to sound at a location where proper and high quality reception of the data by display terminal 30 is possible. Alternatively, if the user is trying to find a place in a house or the like in advance, before transmission of the data, that is suitable for high quality reception of the transmitted data by display terminal 30, fixed data stored in base apparatus 10 may be transmitted from base apparatus 10 to display terminal 30 to determine a proper location for subsequently receiving data. This stored data can be transmitted from base unit 10 to display terminal 30 in response to the operation of key operation section 16 of base apparatus 10, or in response to a request input through key operation section 35 or control panel 37 of display terminal 30.

In reception quality supervision section 77, bit errors of the received decompressed data are detected by bit error detection section 72. An error rate per unit time is then calculated by bit error rate calculation section 73 as shown by a dotted line in an upper left portion of FIG. 8. The unit time may be set to several fractions of second, approximately one second, or any other desired value allowing for comparison of successive time periods, as noted with respect to the first embodiment.

Comparison arithmetic operation section 78 compares the bit error rate calculated by bit error rate calculation section 73 with a threshold value (reference value) read out from memory 79. In accordance with this embodiment of the invention, for example, a first relatively high threshold value Lth1 and a second relatively low threshold value Lth2 are stored in advance in memory 79. One of these two threshold values is read out from the memory 79 in accordance with a type of data received by display terminal 30. The selected threshold is then compared with the bit error rate calculated by bit error rate calculation section 73.

For example, in order to receive a ground wave television broadcast or a BS/CS digital broadcast data received by display terminal 30 includes image data of moving pictures. Therefore a high reception quality level is required for the data to be properly displayed by display terminal 30. In such a case the lower bit error rate threshold value Lth2 is read out from memory 79 and compared with the determined bit error rate. However, in order to receive data of an Internet homepage or the like, a high reception quality level is not required. In this case the higher bit error rate threshold value Lth1 is read out from the memory 79 and compared with the determined bit error rate.

Bit error detection section 72, bit error rate calculation section 73 and comparison arithmetic operation section 78 of the reception quality supervision section 77 may be formed from a CPU, a ROM, a RAM and so forth which form the main control section 41. Also a RAM or the like, which is preferably a component of main control section 41 can be used for memory 79. Of course other memory schemes may be used for all of these components, as is well known in the art.

Figure 9:
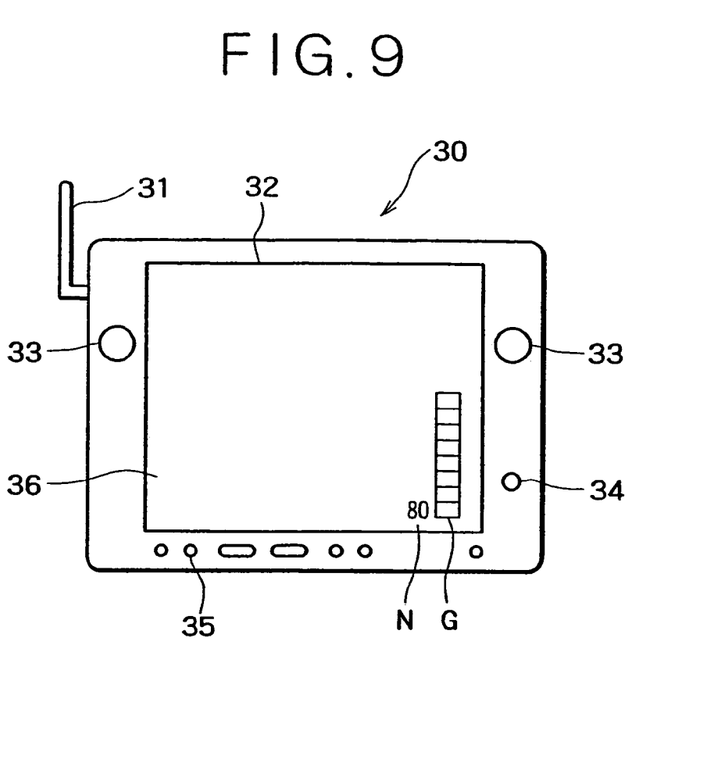
FIG. 9 is a schematic view showing an example of display on the display portion of the display terminal of FIG. 7 displaying the reception quality level utilizing a bar graph and a numerical value in accordance with the invention.

An output of comparison arithmetic operation section 78 is forwarded to reception quality display control section 76. Reception quality display control section 76 produces data for displaying the quality level of the reception of data at display terminal 30, for example, in both a bar graph and a numerical value on LCD apparatus 32. This display data is generated in accordance with the output of comparison arithmetic operation section 78. This display data is then forwarded to display control section 45. Consequently, the quality level of reception of data is displayed on LCD apparatus 32, preferably as both a bar graph G and a numerical value N as shown in FIG. 9.

In accordance with this embodiment of the invention, the result of the arithmetic operation of comparison arithmetic operation section 78 does not vary in a binary fashion depending upon whether the bit error rate is higher than the threshold value Lth1 or Lth2, but rather varies in the following manner. If the bit error rate is equal to the selected threshold value Lth1 or Lth2, then the displayed bar graph G has a length of 50% compared with a reference length and the displayed numerical value N has a value of "50" compared with a reference value. If the bit error rate is higher than the selected threshold value Lth1 or Lth2, then the displayed bar graph G is shorter than 50% and the displayed numerical value N is lower than "50" in accordance with the difference of the bit error rate from the selected threshold value Lth1 or Lth2. If the bit error rate is lower than the selected threshold value Lth1 or Lth2, the displayed bar graph G is longer than 50% and the displayed numerical value N is higher than "50" in accordance with the difference of the bit error rate from the selected threshold value Lth1 or Lth2.

The result from comparison arithmetic operation section 78 is held for the unit time described above by the comparison arithmetic operation section 78 or the reception quality display control section 76. Therefore, a value for this result is not a value that appears intermittently after each time unit but rather can be varied after each time unit and is therefore displayed continuously over time. Consequently, the bar graph G and the numerical value N on the LCD apparatus 32 are not displayed intermittently. Rather the length (height) of the bar graph and the numerical value N can be varied after each unit time and are displayed continuously and successively.

Figure 8:
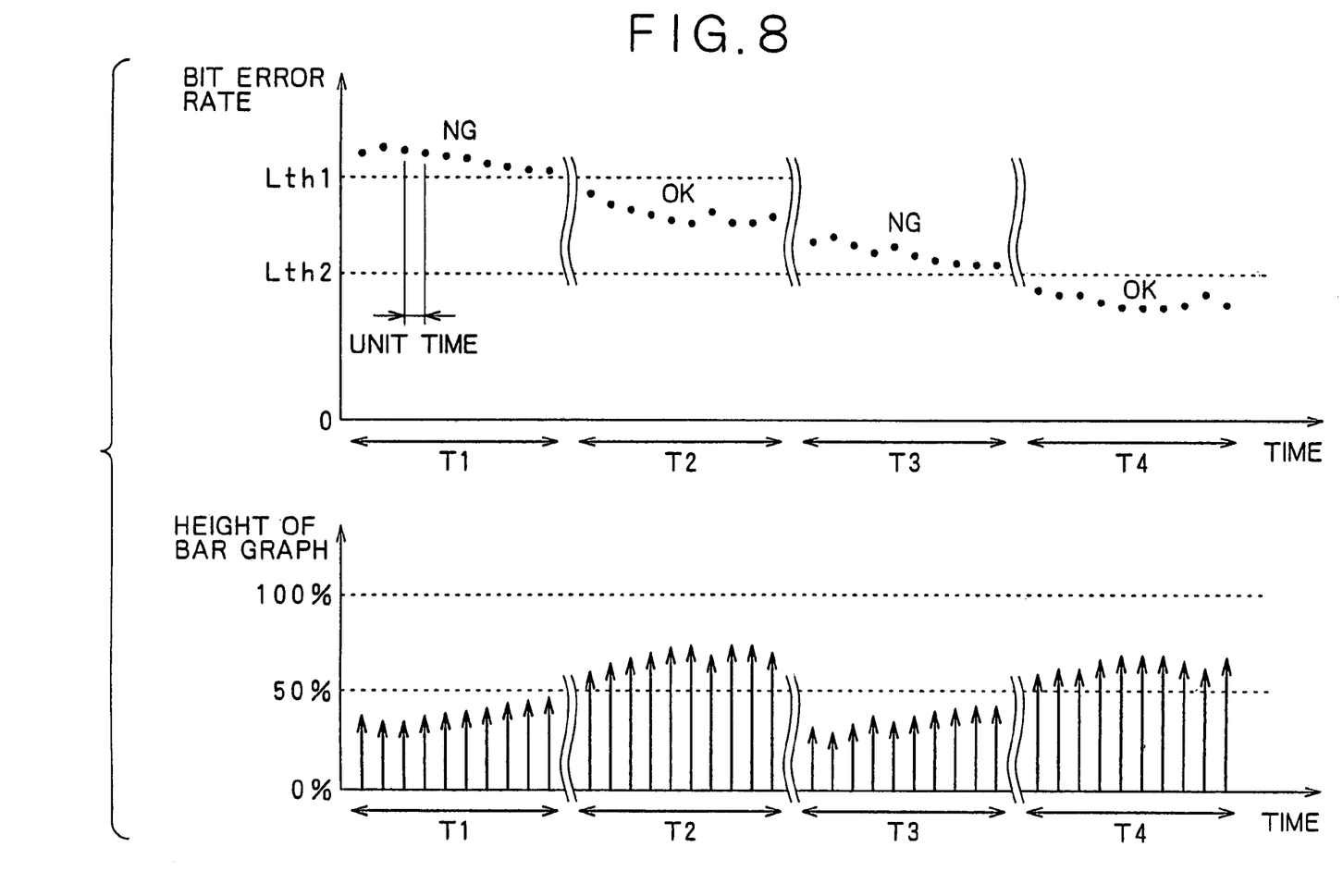
FIG. 8 is a diagrammatic view illustrating a relationship between the variation of the bit error rate and the variation of a bar graph for displaying the reception quality level by the display terminal of FIG. 7 in accordance with the invention.

In a period T1 of FIG. 8, the threshold value Lth1 is selected and read out from memory 79 because data requiring only a low reception quality has been selected. The multi-path interference at time T1 is high, the quality level of the received data at display terminal 30 is low and the bit error rate is therefore higher than the threshold value Lth1. If the user changes the reception location so as to decrease the multi-path interference, then the quality level of the received data at display terminal 30 becomes higher and the bit error rate becomes lower than the threshold value Lth1 as is shown at a period T2 of FIG. 8.

In a period T3 of FIG. 8, the threshold value Lth2 is read out from the memory 79 because data requiring a higher data transmission quality and therefore lower bit error rate is to be received by display terminal 30. However, the multi-path interference at time T3 is high, the quality level of the received data at display terminal 30 is comparatively low and the bit error rate is therefore higher than the threshold value Lth2. If the user changes the reception location so as to decrease the multi-path interference sufficiently, then the reception quality level of the display terminal 30 becomes sufficiently high and the bit error rate becomes lower than the threshold value Lth2 as is shown at a time T4 of FIG. 8.

Display of the various bar graphs, numerical data and the like indicative of quality level of the received data may be performed in accordance with a user command, or automatically, as in the first embodiment. When a user command controls the display, if the user turns off the display of the quality level of the received data, no display is performed and the underlying calculations noted above are also not performed.

In accordance with display terminal 30 constructed in accordance with the second embodiment of the invention, the user can easily determine that the quality level of the received data is low as a result of high multi-path interference. Consequently, when the reception quality level is low, the user can move the display terminal 30 to a location to improve reception. Therefore, display terminal 30 will be able to receive data transmitted from the base apparatus 10 with low multi-path interference and a high quality level of received data.

Figure 10:
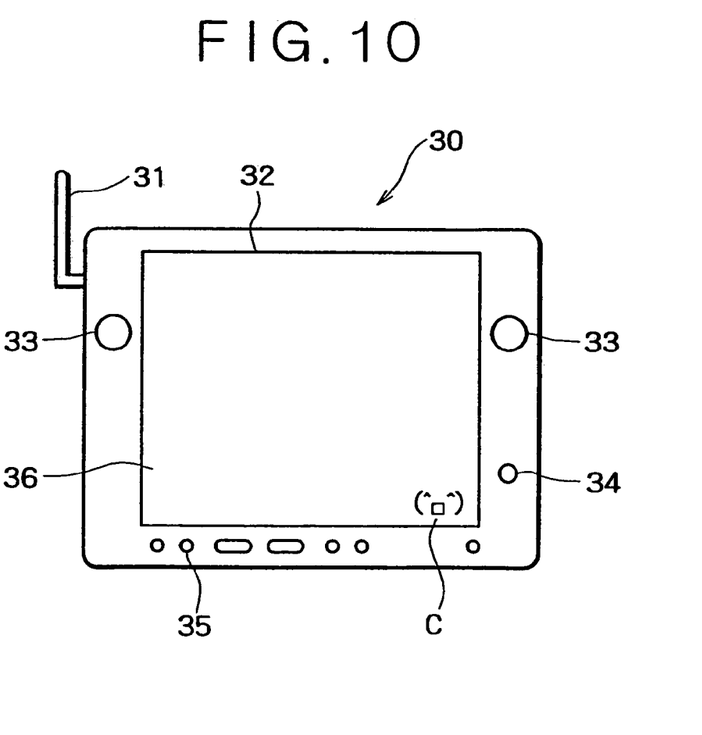
FIG. 10 is a schematic view showing an example of display on the display portion of the display terminal of FIG. 7 of the reception quality level utilizing plotting information in accordance with the invention.

The reception quality information may be displayed by any of the methods noted with respect to the first embodiment of the invention. Additionally, the quality level of the received data may be displayed as plotting information, for example, by changing the expression of a character C representing the face of a person as shown in FIG. 10. Furthermore, sound may be output as such an indication. The tone or intermittent interval may vary in accordance with the quality level of the received data, making use of the system of the D/A converter 46, audio amplifier 47 and speaker 33 shown in FIG. 3.

As with the first embodiment of the invention, it is possible to connect an external apparatus such as a DVD player or a digital VTR (Video Tape Recorder) to base apparatus 10 such that video data and audio data from the external apparatus are transmitted from base apparatus 10 to display terminal 30. Also it is possible to construct a radio LAN system from one base apparatus and a plurality of display terminals, from a plurality of base apparatus and one display terminal or from a plurality of base apparatus and a plurality of display terminals.

It will thus be seen that the objects set forth above, among those made apparent from the preceding description, are efficiently attained and, because certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of law, might be said to fall therebetween.

What is claimed is:

1. A display terminal for a radio LAN system for receiving image data from a apparatus by radio communication and displaying an image based on the received image data on a display, comprising:
    a bit error calculator for calculating a bit error rate per unit time of digital data received from the apparatus;
    a reception quality supervisor for comparing the calculated bit error rate with a threshold value; and
    a reception quality display controller for displaying a quality level of the received data at the display terminal on the displaying said image in accordance with on an output of said reception quality supervisor,
    wherein, in response to a signal from the reception quality supervisor, a fixed digital data stored in the base apparatus is received prior to receiving the image data based on the calculated bit error rate of the fixed digital data.

2. The display terminal according to claim 1, wherein a 2.4 GHz band or a 5 GHz band is used as a frequency band for the radio communication.

3. The display terminal according to claim 1, wherein the reception quality display controller displays the quality level of the received data at said display terminal based on the output of said reception quality supervision section only when said reception quality display control section is set to a display-on state.

4. The display terminal according to claim 1, wherein said reception quality display controller displays a variation of the quality level of the received data at the display terminal continuously with respect to time as a bar graph and/or a numerical value in accordance with the output of said reception quality supervisor on said display.

5. The display terminal according to claim 4, wherein when the calculated bit error rate is equal to the threshold value the bar graph is displayed with a reference length or the numerical value is displayed with a reference value, and when the calculated bit error rate is lower than the threshold value, a longer bar graph is displayed or a higher numerical value is displayed.

6. The display terminal according to claim 1, wherein said reception quality display controller continuously displays a variation of the quality level of the received data at the display terminal with respect to time as plotting information in accordance with the output of said reception quality supervisor.

7. The display terminal according to claim 1, wherein the threshold value is variable in response to a type of digital data received from the different apparatus.

8. A display terminal for a radio LAN system for receiving image data from a base apparatus by radio communication and displaying an image based on the received image data on a display, comprising:
    a bit error calculator for calculating a bit error rate per unit time of digital data received from the apparatus;
    a reception quality supervisor for comparing the calculated bit error rate with one of a plurality of threshold values, said one of said plurality of threshold values being selected in accordance with a type of data to be received by the display terminal; and
    a reception quality display controller for displaying a quality level of the received data at the display terminal on the display displaying said image in accordance with on an output of said reception quality supervision section,
    wherein, in response to a signal from the reception quality supervisor, a fixed digital data stored in the base apparatus is received prior to receiving the image data based on the calculated bit error rate of the fixed digital data.

9. The apparatus of claim 8, wherein one of said plurality of threshold values corresponds to the receipt of a high quality data.

10. The apparatus of claim 8, wherein one of said plurality of threshold values corresponds to the receipt of a low quality data.

11. A method for displaying an image based on a received image data on a display terminal for a radio LAN system for receiving image data from a base apparatus by radio communication, comprising the steps of:
- calculating a bit error rate per unit time of digital data received from the apparatus;
- comparing the calculated bit error rate with a threshold value; and
- displaying a quality level of the received data at the display terminal on the display in displaying said image accordance with the compared calculated bit error rate and threshold value on an output of said reception quality supervisor,
- wherein, in response to a signal from the reception quality supervisor, a fixed digital data stored in the base apparatus is received prior to receiving the image data based on the calculated bit error rate of the fixed digital data.

12. The display method according to claim 11, wherein a 2.4 GHz band or a 5 GHz band is used as a frequency band for the radio communication.

13. The display method according to claim 11, wherein the quality level of the received data at said display terminal is displayed based upon said compared calculated error bit rate only when said reception quality display control section is set to a display-on state.

14. The display method according to claim 11, wherein a variation of the quality level of the received data at the display terminal is continuously displayed with respect to time as a bar graph and/or a numerical value in accordance with said compared calculated error bit rate.

15. The display method according to claim 14, wherein when the calculated bit error rate is equal to the threshold value the bar graph is displayed with a reference length or the numerical value is displayed with a reference value, and when the calculated bit error rate is lower than the threshold value, a longer bar graph is displayed or a higher numerical value is displayed.

16. The display method according to claim 11, wherein a variation of the quality level of the received data at the display terminal with respect to time is displayed as plotting information.

17. The display method according to claim 11, wherein the threshold value is variable in response to a type of digital data received from the different apparatus.

18. A method for displaying an image based on a received image data on a display terminal for a radio LAN system for receiving image data from a base apparatus by radio communication, comprising the steps of:
- calculating a bit error rate per unit time of digital data received from the apparatus;
- selecting one of said plurality of threshold values in accordance with a type of data to be received by the display terminal;
- comparing the calculated bit error rate with one of a plurality of threshold values; and
- displaying a quality level of the received data at the display terminal displaying said image in accordance with the calculated bit error rate per unit time of the digital data received by the display apparatus,
- wherein, in response to a signal from the reception quality supervisor, a fixed digital data stored in the base apparatus is received prior to receiving the image data based on the calculated bit error rate of the fixed digital data.

19. The method of claim 18, wherein one of said plurality of threshold values corresponds to the receipt of a high quality data.

20. The method of claim 18, wherein one of said plurality of threshold values corresponds to the receipt of a low quality data.

* * * * *